(12) United States Patent
Iwago

(10) Patent No.: US 7,392,009 B2
(45) Date of Patent: Jun. 24, 2008

(54) FEEDING DEVICE FOR AN IMAGE READING APPARATUS

(75) Inventor: Toshitaka Iwago, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 322 days.

(21) Appl. No.: 10/876,558

(22) Filed: Jun. 28, 2004

(65) Prior Publication Data

US 2004/0263921 A1 Dec. 30, 2004

(30) Foreign Application Priority Data

Jun. 30, 2003 (JP) .............................. 2003-186332

(51) Int. Cl.
*G03G 15/00* (2006.01)

(52) U.S. Cl. .................. 399/367; 399/379; 399/380; 271/3.14

(58) Field of Classification Search ................ 399/380, 399/367, 379
See application file for complete search history.

(56) References Cited

U.S. PATENT DOCUMENTS

| | | | | |
|---|---|---|---|---|
| 5,339,139 A * | 8/1994 | Fullerton et al. | ............ | 399/203 |
| 5,680,203 A * | 10/1997 | Kobayashi et al. | ............ | 355/76 |
| 5,881,350 A * | 3/1999 | Wada et al. | ............ | 399/367 |
| 6,256,473 B1 * | 7/2001 | Kamanuma et al. | ......... | 399/367 |
| 6,619,649 B2 * | 9/2003 | Takamatsu | ............... | 271/3.14 |
| 7,021,618 B2 * | 4/2006 | Watanabe et al. | .......... | 271/3.14 |
| 2003/0026633 A1 * | 2/2003 | Nakagawa et al. | .......... | 399/367 |
| 2005/0163546 A1 * | 7/2005 | Kim | ............................ | 399/367 |
| 2006/0013627 A1 * | 1/2006 | Choi | ........................... | 399/367 |

FOREIGN PATENT DOCUMENTS

| | | | |
|---|---|---|---|
| JP | 01162651 A | * | 6/1989 |
| JP | U 1-100140 | | 7/1989 |
| JP | A-4-120531 | | 4/1992 |
| JP | 05155463 A | * | 6/1993 |
| JP | A-8-201929 | | 8/1996 |
| JP | A-11-79460 | | 3/1999 |
| JP | B2 3175075 | | 4/2001 |
| JP | A-2002-077516 | | 3/2002 |

* cited by examiner

*Primary Examiner*—Ren Yan
*Assistant Examiner*—Matthew G Marini
(74) *Attorney, Agent, or Firm*—Oliff & Berridge, PLC

(57) ABSTRACT

A feeding device to be incorporated in an image reading apparatus, including: (a) a feed-path definer defining a feed path along which an original is fed from a supply portion to an exit portion via a reading position, such that the fed original is brought into contact with an original supporting surface of an image reader in the reading position, whereby the image is read by the image reader; (b) a presser biased toward the original supporting surface and having a contact surface which is to be held in contact with the original or the original supporting surface; (c) a downstream-side feeder disposed on a downstream side of the presser and distant from a plane containing the original supporting surface, so that the original takes an inclined posture while bridging between the presser and the downstream-side feeder; and (d) a presser-displacement preventer disposed between the presser and the downstream-side feeder, for preventing displacement of the presser in a direction away from the original supporting surface.

16 Claims, 7 Drawing Sheets

FEEDING DEVICE FOR AN IMAGE READING APPARATUS

This application is based on Japanese Patent Application No. 2003-186332 filed in Jun. 30, 2003, the content of which is incorporated hereinto by reference.

BACKGROUND OF THE INVENTION

1. Field of the Invention

The present invention relates in general to a feeding device to be incorporated in an image reading apparatus equipped with an image reader which is operable to read an image on an original in a predetermined reading position while the original is being fed by the feeding device. More particularly, the invention is concerned with a feeding device defining a feed path by which the original takes, after having passed the reading position, a posture inclined with respect to an original supporting surface of the image reading apparatus.

2. Discussion of Related Art

In general, in an image reading apparatus capable of reading an image carried by an original which is being currently moved or fed as well as an image on an original which is held stationary there are provided two different transparent plates, one of which serves or taking the image on the currently fed original, and the other of which serves for taking the image on the stationary original. It is common that the two transparent plates are provided on an upper surface of a main body of the image reading apparatus (which surface is exposed when a cover body disposed on the upper surface is open) such that the two transparent plates are arranged in a longitudinal direction of the main body of the image reading apparatus. The transparent plate for the image on the stationary original has a size (as measured in the longitudinal direction of the main body of the image reading apparatus) which is as large as a length of an original having a maximum size acceptable by the image reading apparatus. The original is disposed on an upper surface of the transparent plate, so that the image on the stationary original is taken or read by an image reader which is moved along a lower surface of the transparent plate. On the other hand, the transparent plate for the image carried by the fed original has a size (as measured as in the longitudinal direction of the main body of the image reading apparatus) smaller than the above-described size of the transparent plate for the stationary original. The image of the fed original is read, when the original passes over an upper surface of the transparent plate, by the image reader which is held stationary below a lower surface of the transparent plate.

For improving an accuracy in reading the image on the original the stationary original can be pressed onto the upper surface of the transparent plate, by closing the above-described cover body. For the same purpose, the fed original is brought into contact or proximity with the upper surface of the transparent plate, when the original passes over the upper surface of the transparent plate. As a mechanism for bringing the fed original into contact or proximity with the upper surface of the transparent plate, JP-U-H01-100140 (publication of unexamined Japanese Utility Model laid open in 1989) discloses a holder plate which is disposed above the transparent plate and which is biased downwardly toward the transparent plate. The holder plate has spacers provided on its lower surface such that the spacers are positioned in such positions that do not interfere feed movement of the original. Owing to the provision of the spacers, the holder plate can be positioned above the transparent plate, with a constant spacing gap (denoted by reference si "G" in FIG. 1 of the Japanese publication) therebetween which corresponds to a height of the spacers, so that the original passing through the gap between the holder plate and the transparent plate can be prevented from being separated from the transparent plate by a distance larger than the height of the spacers.

Although a CCD (Charge Coupled Device) has been commonly used as the image reader of the above-described image reading apparatus, a CIS (Contact Image Sensor) as well as the CCD is used as the image reader in recent years, due to its size and cost which are smaller and lower than those of the CCD. However, the CIS has a smaller depth of field than that of the CCD. Therefore, where the above-described holder plate with the spacers, as disclosed in the above-described Japanese publication, is provided in an image reading apparatus equipped with the CIS as the image reader, the image reading apparatus could not provide a satisfactorily high degree of accuracy in the image reading, because upward displacement of the original from the transparent plate within the spacing gap is allowed. That is, where the CIS is used as the image reader, the original has to be brought into dose contact with the upper surface of the transparent plate, i.e., an original supporting surface of the image reader, thereby requiring an arrangement in which the original is pressed onto the original supporting surface by a presser plate member or the like which is biased to be brought into contact with the original.

It is common that a feeding device for feeding the original is built within the above-described cover body. For making the feeding device compact in size, it is also common that a feed path, along which the original is id from an original supply portion to an original exit portion via a reading position, is adapted to have a substantially U shape.

For obtaining a space available for piling up the originals which have exited through the original exit portion, it is common that the original exited portion is located in a position higher than the reading position, so that the original takes a posture inclined with respect to the original supporting surface, with a portion of the original closer to the original exit portion being given a position higher than a portion of the original closer to the reading position. Therefore, where the above-described presser plate member or the like is provided in the reading position, a force derived from a tension of the inclined original acts on the presser plate member in the upward direction, in a direction away from the original supporting surface. In this instance, if a biasing force acting on the presser plate member in the downward direction is not large enough to overcome the upward force, the original as well as the presser plate member is likely to be displaced upwardly. The upward displacement or separation of the original from the original supporting surface causes deterioration in the reading accuracy, particularly, where the CIS is used as the image, reader On the other hand, if the biasing force is adapted to be excessively increased, the excessively increased biasing force results in an increase in resistance against sliding movement of the original between the presser plate member and the transparent plate, thereby making it impossible to permit the original to enter between the presser plate member and the transparent plate, particularly, where the original is provided by a thin paper sheet.

SUMMARY OF THE INVENTION

The present invention was made in view of the background prior art discussed above. It is therefore an object of the present invention to provide a feeding device in which an original is, upon its arrival in an image reading position, brought into contact with an original supporting surface, and is held in contact with the original supporting surface without undesirable separation of the original away from the original supporting surface, for assuring high accuracy in the reading of an image carried by the original. This object may be achieved according to any one of first through eighth aspects of the invention which are described below.

The first aspect of the invention provides a feeding device to be incorporated in an image reading apparatus including an image reader operable to read an image carried by an original which is being fed by the feeding device in a feed direction, the feeding device comprising: (a) a feed-path definer defining a feed path along which the original is fed from an original supply portion to an original exit portion via a reading position, such that the original supplied through the original supply portion is, upon arrival thereof in the reading position, brought into contact with an original supporting surface of the image reader whereby the image is read by the image reader, and such that the original exits the feeding device through the original exit portion after the image has been read by the image reader; (b) a presser opposed to the original supporting surface and biased toward the original supporting surface, the presser having a contact space which is held in contact with the original during presence of the original between the presser and the original supporting surface and which is held in contact with the original supporting surface during absence of the original between the presser and the original supporting surface; (c) a downstream-side feeder disposed on a downstream side of the presser as viewed in the feed direction, and operable to feed the original in the feed direction, the downstream-side feeder being distant from a plane containing the original supporting surface, so that the original takes a posture inclined with respect to the plane when the original bridges between the presser and the downstream-side feeder; and (d) a presser-displacement preventer which is disposed between the presser and the downstream-side feeder as viewed in the feed direction, for preventing displacement of the presser in a direction away from the original supporting sure.

In the present feeding device, the presser-displacement preventer prevents undesirable displacement of the presser in the direction away from the original supporting surface, which displacement could be caused by a tension of the original if the presser-displacement preventer were not provided in the feeding device. It is therefore no longer necessary to excessively increase a biasing force applied to the presser toward the original supporting surface. It is therefore possible to avoid an increase in resistance against movement of the original between the presser and the original supporting surface, which increase could be caused if the biasing force were excessively increased. That is, in the present feeding device, the biasing force can be set to be an appropriate value which does not impede the feed movement of the original.

According to the second aspect of the invention, in the feeding device defined in the first aspect of the invention, the original exit portion is distant from the plane, such that a shortest route connecting a downstream end of the contact surface and the original exit portion is inclined with respect to the plane by an angle that is not smaller than 18°, wherein the presser-displacement preventer includes a detour definer having a contact portion which is to be brought into contact with the original and which is positioned in one of opposite sides of the shortest route that is closer to the plane, for defining a detour which connects the downstream end of the contact surface and the original exit portion and which includes a first section between the downstream end of the contact surface and the contact portion of the detour definer and a second section between the contact portion of the detour definer and the downstream-side feeder, and wherein an inclination of the first section of the detour with respect to the plane is smaller than an inclination of the second section of the detour with respect to the plane. In this arrangement, the original is, after its release from the presser, made inclined with respect to the above-described plane by an angle smaller, than in an arrangement in which the original is fed from the presser toward the downstream-side feeder along the shortest route. It is therefore possible to reduce a component of the tension of the original which component forces the presser to be displaced away from the original supporting surface.

According to the third aspect of the invention, in the feeding device defined in the second aspect of the invention, the detour definer of the presser-displacement preventer includes a rotatable member rotatable about an a thereof that is distant from the plane, wherein the rotatable member is positioned in such a position that permits an outer circumferential surface of the rotatable member as the contact portion to intersect the shortest route. In this arrangement, the original is, after its release from the presser, brought into contact with the outer circumferential surface of the rotatable member of the presser-displacement preventer, so that the inclination of the posture of the original with respect to the plane is made smaller than in an arrangement in which the original is fed along the shortest route. Since the detour definer of the presser-displacement preventer is provided by the rotatable member which is rotatable by a drive source such as an electric motor, or which is rotatable by feed movement of the original brought into contact with the outer circumferential surface of the rotatable member, the feed movement of the original is not impeded by the detour definer, even where the original is considerably bent by the detour definer, namely, even where the degree of the inclination of the posture of the original is drastically changed by the detour definer According to the fourth aspect of the invention, in the feeding device defined in the third aspect of the invention, the rotatable member is rotated by feed movement of the original which is brought into contact with the outer circumferential surface of the rotatable member. In this arrangement, the rotatable member is rotated together with the feed movement of the original brought into contact with the outer circumferential surface of the rotatable member, for thereby minimizing sliding of the original on the outer circumferential surface, which sliding would generate a friction resisting the feed movement of the original.

According to the fifth aspect of the invention, in the feeding device defined in the third or fourth aspect of the invention, the downstream-side feeder includes a pair of rollers which are opposed at opposed portions thereof to each other, so as to pinch the original therebetween, wherein the rotatable member is positioned in vicinity of a downstream end of the contact surface of the presser, such that a distance between the downstream end of the contact surface and the axis of the rotatable member as measured in a direction parallel with the plane is not larger than one-third a distance between the axis of the rotatable member and the opposed portions of the pair of rollers as measured in a direction parallel with the plane. In this arrangement in which the rotatable member is positioned in vicinity of the downstream end of the contact surface of the presser, it is possible to minimize the inclination of the first section of the detour, even without the inclination of the second section of the detour being made considerably large. In other words, it is possible to minimize the above-described component of the tension of the original (which component forces the presser to be displaced away from the original supporting surface), while preventing an increase in the resistance applied from the rotatable member to the feed movement of the original.

According to the sixth aspect of the invention, in the feeding device defined in any one of the third through fifth aspects of the invention, the rotatable member includes a radially outer portion which is provided by an elastic portion.

According to the seventh aspect of the invention, in the feeding device defined in any one of the third through fifth aspects of the invention, the rotatable member includes a small diameter portion and a large diameter portion which has a larger diameter than that of the small diameter portion, wherein the large diameter portion is preferably provided by an elastic portion.

According to the eighth aspect of the invention, in the feeding device defined in any one of the first through seventh aspects of the invention, the presser includes a holder portion, and at least one contact roller which is held by the holder portion such that each of the above-described at least one contact roller is rotatable about an axis thereof which is parallel with the original supporting surface and which is perpendicular to the feed direction, wherein each of the above-described at least one contact roller has an outer circumferential surface which provides the contact surface. In this arrangement in which the contact surface is provided by the outer circumferential surface of each of the above-described at least one contact roller, it is possible to reduce the resistance against the movement of the original between the presser and the original supporting surface, even without reducing the biasing force applied to the presser toward the original supporting surface.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE PREFERRED EMBODIMENT

Figure 1:
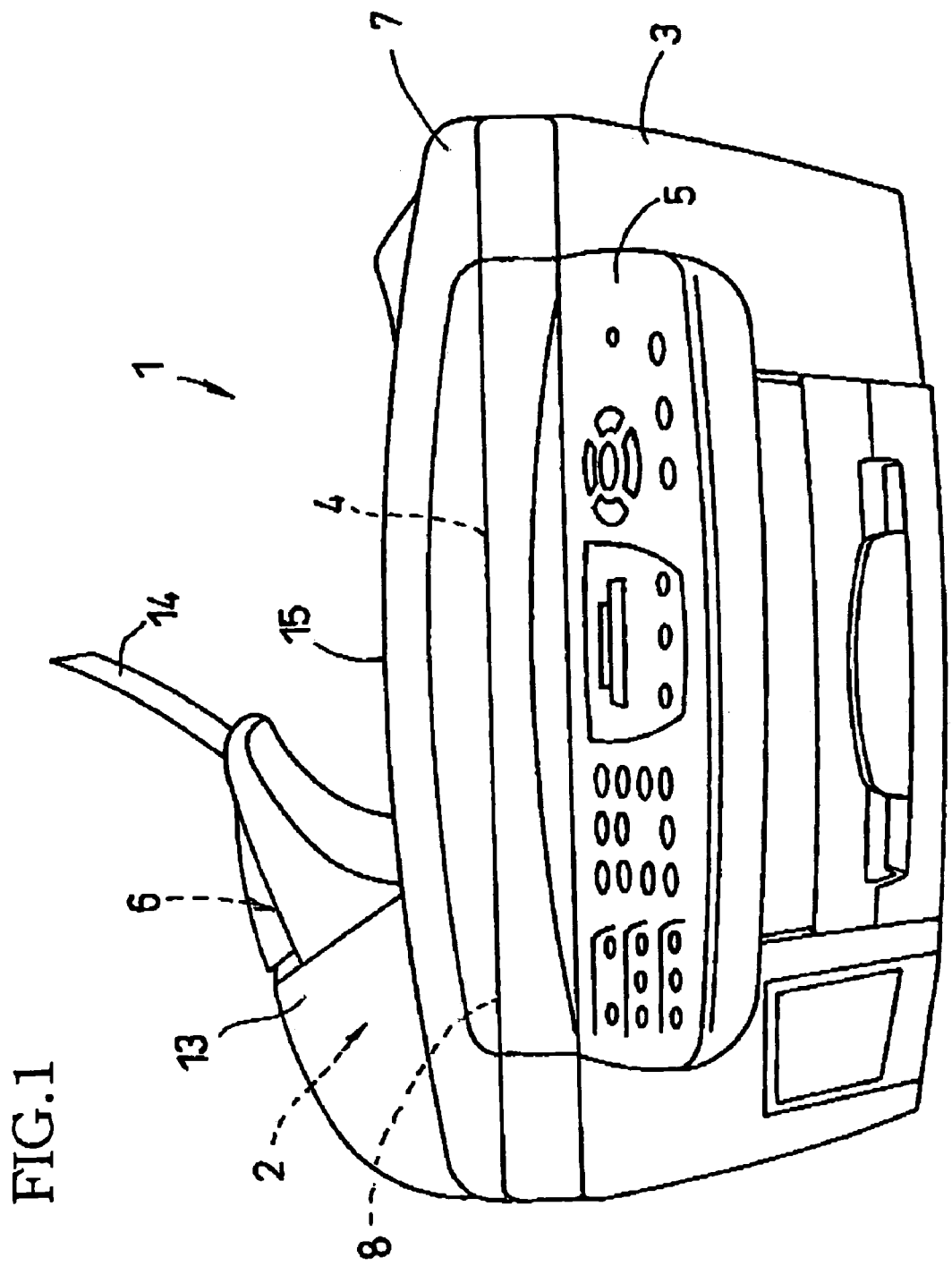
FIG. 1 is a front view of a multifunction apparatus equipped with a feeding device which is constructed according to the invention.

FIG. 1 shows a multifunction apparatus (multiplex apparatus) 1 having facsimile, scanner, copier and printer functions. This multifunction apparatus 1 is equipped with an image reading apparatus to which a feeding device 2 constructed according to an embodiment of the invention is incorporated.

Figure 2:
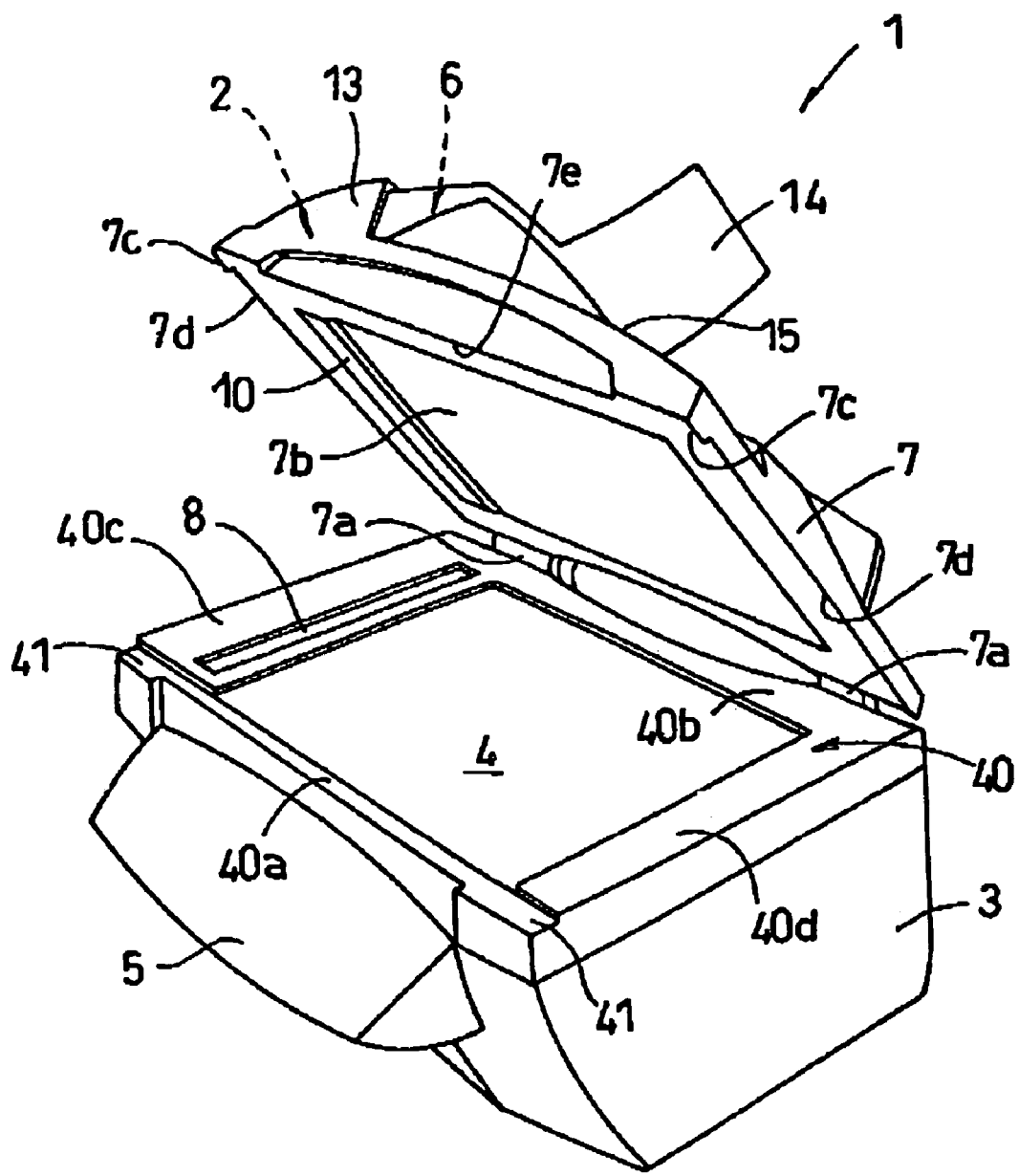
FIG. 2 is a perspective view of the multifunction apparatus of FIG. 1 when its cover body is open.
Figure 3:
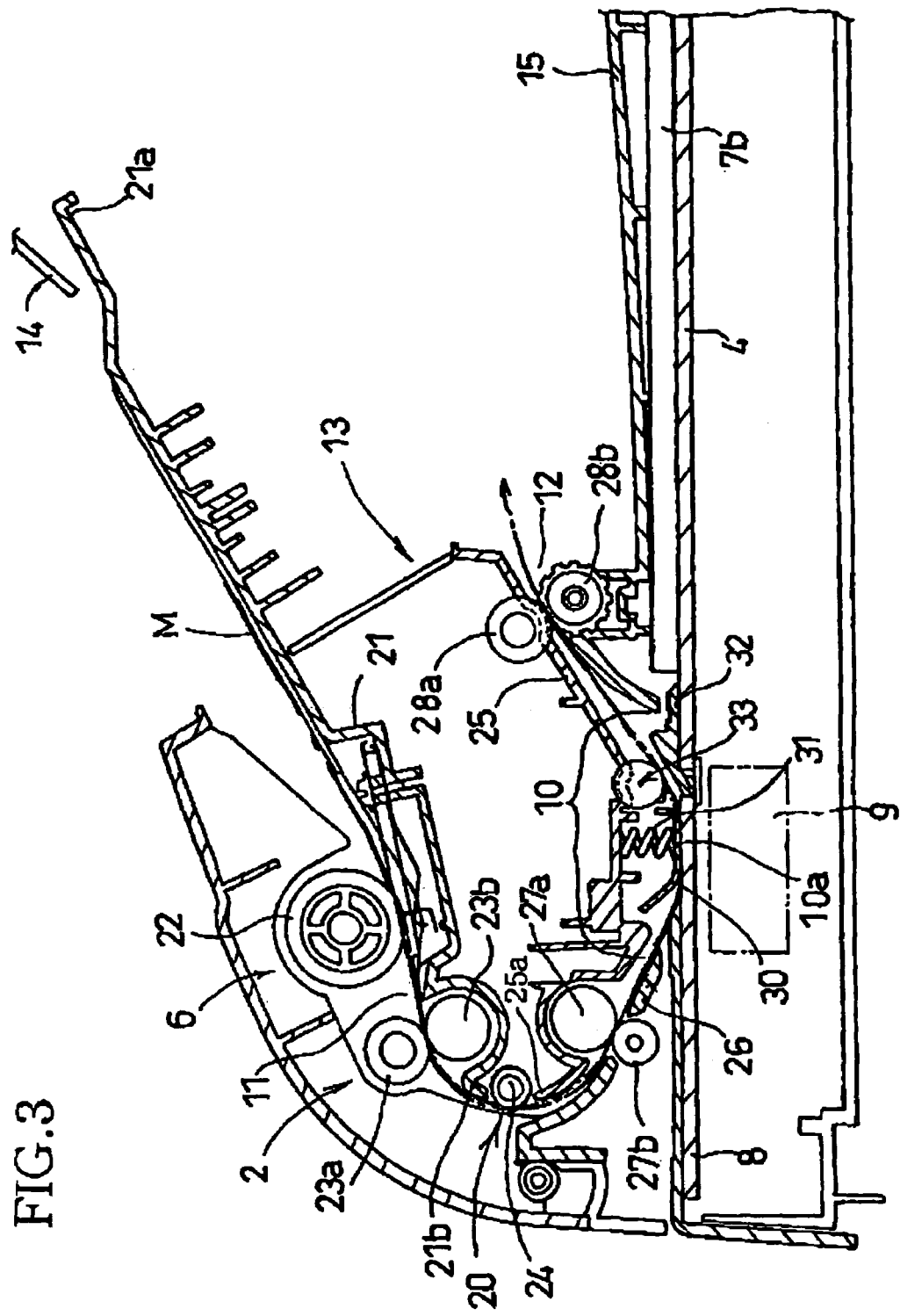
FIG. 3 is a front view partially in cross section of the feeding device incorporated in the multifunction apparatus of FIG. 1.

The multifunction apparatus 1 has, on an upper face of its main body 8, a cover body 7 provided to be pivotable about a hinge 7a which is located in a rear end of the upper face, between its open and closed positions as shown in FIG. 2. The feeding device 2 is built in this cover body 7, as shown in FIG. 3. An automatically supplying device 6 is disposed in the cover body 7, so as to be contiguous to the feeding device 2. First and second transparent plates 4, 8, which are provided by glass plates or the like, are horizontally fixed on the upper face of the main body 3 which is exposed when the cover body 7 is open. The first transparent plate 4 is disposed in a central portion of the upper face of the main body 3, while the second transparent plate 8 is disposed in an end portion of the upper face of the main body 3. The multifunction apparatus 1 further has an operator's control panel 5 which is provided to project forwardly from the main body 3. The control panel 5 is equipped with a liquid-crystal display for indicating a commanded subject and an error message, and various keys such as ten keys and function keys which are manually operable by an operator of the apparatus 1, to input various command signals for various operations (e.g., facsimileing, scanning and copying operations) to be performed by the apparatus 1. The image reading apparatus provided for carrying out the scanning and copying operations is equipped with an image reader 9 (provided by CIS, for example) which is located on a lower Bide of the second transparent plate 8, as shown in FIG. 3.

Where a paper sheet as an original is disposed on the first transparent plate 4 (such that its surface having the image faces the upper surface of the plate 4), the image reader 9 is moved along guide rails (not shown) which are disposed on the lower surface of the plate 4, so as to read the image. In this instance, the, paper sheet is pressed onto the upper surface of the plate 4, by the cover body 7 which is held in its closed position. It is noted that a holder plate body 7b composed of a sponge, a white board and other components is provided on the lower surface of the cover body 7.

The feeding device 2 is constructed such that the paper sheet supplied from the supplying device 6 to an original supply portion 11 is fed, by a plurality of rollers arranged at a spacing interval, to an original exit portion 12 via an image reading position 10a in which the image on the paper sheet is read by the image reader 9. In other words, the feeding device 2 has a feed-path definer defining a feed path 20 along which the paper sheet is fed from the original supply portion 11 to the original exit portion 12 via the reading position 10a, such that the paper sheet supplied through the original supply portion 11 is, upon its arrival in the reading position 10a, brought into contact with the second transparent plate 8 as an original supporting surface (image reading surface) of the image reader 9 whereby the image carried by the paper sheet is read by the image reader 9, and such that the paper sheet goes out of the feeding device 2 through the original exit portion 12 after the image has been read by the image reader 9. In the present embodiment, the feed path 20 is arranged to have a substantially U shape, such that the paper sheet supplied through the original supply portion 11 is, upon its arrival in a U-turn position which is located on an upstream side of the reading position 10a, permitted to make a U-turn 80 as to be fed toward the reading position 10a. First pair of rollers 23a, 23b are provided in the original supply portion 11, while third pair of rollers 28a, 28b (serving as a downstream-side feeder) are provided in the original exit portion 12. It is noted that the feed path 20 is defined by the feed-path definer to have a width corresponding to a width of a maximum-sized paper sheet acceptable by the feeding device 2.

The cover body 7 has a casing portion 13 provided for covering the feeding device 2 and the supplying device 6 which are built in the cover body 7, as shown in FIGS. 1-3. To an end of the casing portion 13, there is attached an original supply tray 14 on which the paper sheets are to be piled. This original supply tray 14 takes an inclined posture such that its distal end portion is located in a higher position than its proximal end portion (at which the supply tray 14 is attached to the casing portion 13). The cover body 7 further has an original exit tray 16 which is located below the original supply tray 14.

As shown in FIG. 3, the above-described feed-path definer defining the U-shaped feed path 20 is constituted principally by an upper plate 21 which defines a first half of the U-shaped feed path 20, and an intermediate plate 25 and a lower plate 26 which cooperate with each other to define a second half of the U-shaped feed path 20. The upper plate 21 is positioned relative to the original supply tray 14 such that its upstream end portion 21a is located in the proximity of the original supply tray 14. On the upper plate 21, there are provided a separate roller 22, an original-presence detector (not shown) and the above-described first pair of rollers 23a, 23b. The separate roller 22 serves to separate an uppermost one of the paper sheets piled on the original supply tray 14, from the other paper sheets, so as to supply the paper sheets one after another. The original-presence detector serves to detect presence of the paper sheet as the original, by its detecting lever which is pivotable upon its contact with a leading end potion of the paper sheet. The first pair of rollers 23a, 23b, which are located on the downstream side of the separate roller 22, consist of a drive roller 23a and a driven roller 23b. The upper plate 21 has a downstream end portion 21b which is downwardly curved so as to guide the paper sheet into a gap between the intermediate plate 25 and the lower plate 26. A U-turn-position roller 24 is provided in the above-described U-turn position which is located between the downstream end portion 21b of the upper plate 21 and an upstream end portion 25a of the intermediate plate 25. The U-turn-position roller 24 is rotatable by the feed movement of the paper sheet as brought into contact its outer circumferential surface.

The intermediate and lower plates 25, 26 of the feed-path definer have downwardly convexed shapes, and are positioned to be substantially opposed to each other with the above-described gap therebetween which provides the second half of the U-shaped feed path 20. Second pair of rollers 27a, 27b are provided on the upstream side of the above-described image reading position 10a, such that the drive roller 27a is disposed on one of opposite sides of the feed path 20 remote from the lower plate 26, while the driven roller 27b is disposed on the other of the opposite sides of the feed path 20 remote from the intermediate plate 25. The above-described third pair of rollers 28a, 28b are provided on the downstream side of the image reading position 10a, such that the drive roller 28a is disposed on one of opposite sides of the feed path 20 remote from the lower plate 26, while the driven roller 28b is disposed on the other of the opposite sides of the feed path 20 remote from the intermediate plate 25. The third pair of rollers 28a, 28b are located to be distant from a plane S containing the upper surface of the second transparent plate 8 such that the pair of rollers 28a, 28b are located in a higher position than a presser plate member 30 (which is described below). The pair of rollers 28a, 28b are thus located above the plane S, for providing a space available for piling up the paper sheets on the original exit tray 15. It is noted that the lower plate 26 has an outwardly extending portion which extends outwardly from the original exit portion 12 and which constitutes the original exit tray 15. It is also noted that each of the above-described drive rollers 23a, 27a, 28a is driven by a drive source (not shown) such as an electric motor In an intermediate portion of the lower plate 26, i.e., a lowermost portion of the lower plate 26 having the downwardly convexed shape, there is formed a reading aperture 10 which has a rectangular shape as viewed in a plan view of the lower plate 26 and which surrounds the above-described image reading position 10a. This reading aperture 10 is opposed to the upper surface of the second transparent plate 8 serving as an original supporting surface. As is apparent from FIGS. 2 and 5, the reading aperture 10 having the rectangular shape is elongated in a direction (hereinafter simply referred to as a width direction of the paper sheet which is fed in a feed direction) perpendicular to a feed direction of the paper sheet, and has a predetermined width as measured in the feed direction.

Figure 4:
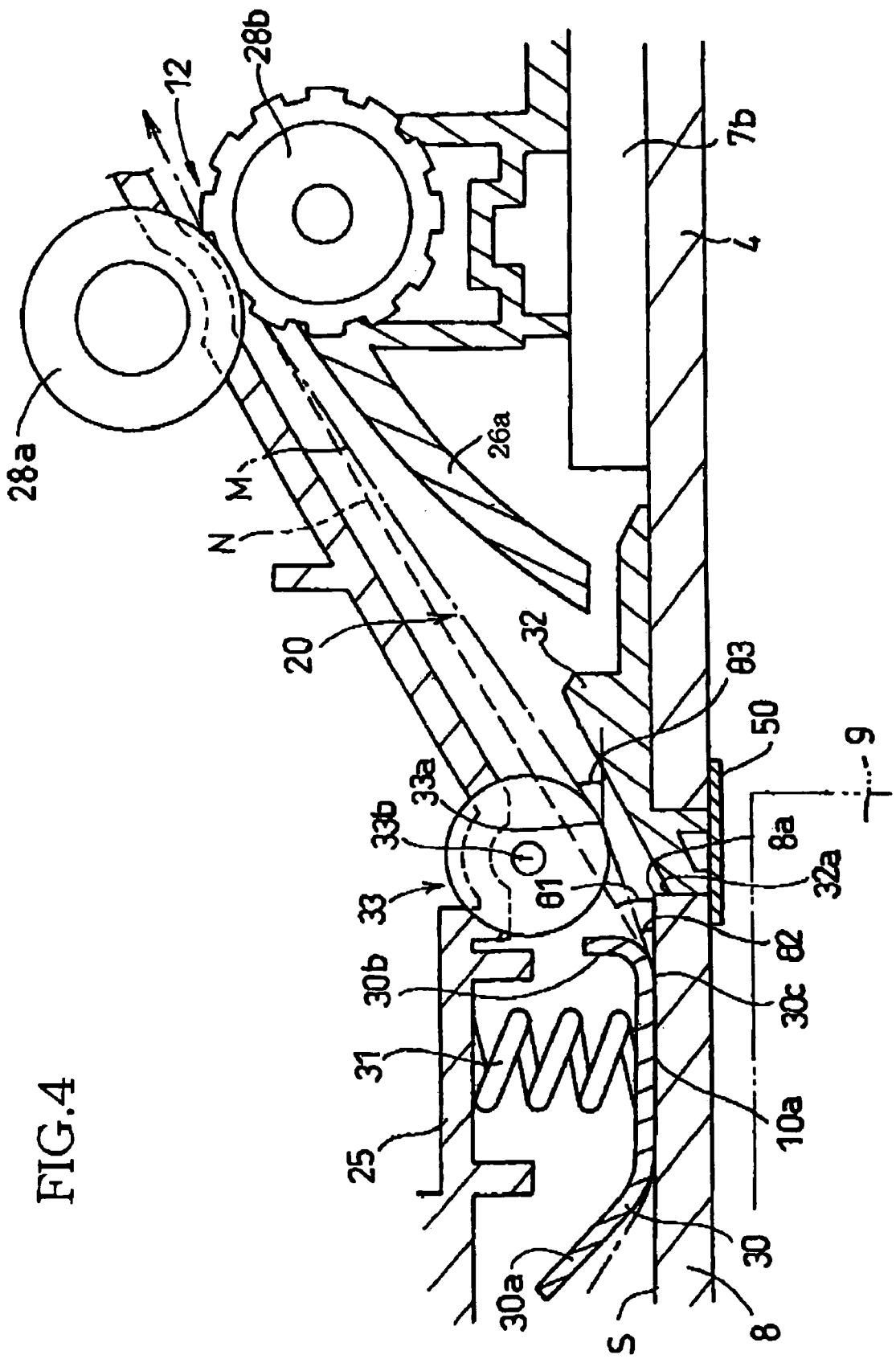
FIG. 4 is an enlarged view showing a part of the feeding device.

The presser plate member 30 is attached to the intermediate plate 25 through a coil spring 31 such that the presser plate member 30 is positioned in the image reading position 10a. The presser plate member 30 is biased by the coil spring 31 which is provided to pass through the reading aperture 10, in the downward direction, i.e., in a direction toward the second transparent plate 8. The presser plate member 30 is elongated in the width direction (see FIG. 5), and has a length (of about 222.4 mm in the present embodiment) which is larger than or substantially equal to the width of the feed path 20 defined by the feed-path definer. As shown in FIG. 4, the presser plate member 30 has upstream and downstream end portions 30a, 30b which are bent in the upward direction, i.e., in a direction away from the second transparent plate 8, for facilitating the feed movement of the paper sheet. The presser plate member 30 further has a flat surface plate portion provided by an intermediate portion which is located between the upstream and downstream end portions 30a, 30b. The flat surface plate portion provides a contact flat surface which is to be brought into contact with the paper sheet or the second transparent plate 8. The upstream end portion 30a of the presser plate member 30 has a suitable length as measured in the feed direction and a suitable angle with respect to the second transparent plate 8, such that the paper sheet can be smoothly introduced between the presser plate member 30 and the second transparent plate 8. The downstream end portion 30b is bent upwardly such that a downstream end 30c of the contact flat surface is rounded, for avoiding abrupt bending of the paper sheet upon its passing below the presser plate member 30. The spring coil 31 serving as a biaser is interposed between the intermediate plate 25 of the feed-path definer and the flat surface plate portion of the presser plate member 30. In the present embodiment, the coil spring 31 is positioned in a central portion of the flat surface plate portion of the presser plate member 30, so that the biasing force is distributed evenly over the entirety of the flat surface plate portion of the presser plate member 30. The biasing force applied by the coil spring 31 is adjusted to such an optimum amount that does not impede sliding movement of the paper sheet between the presser plate member 30 and the second transparent plate 8. It is noted that the lower surface of the presser plate member 30, which is opposed to the second transparent plate 8, is covered with a white tape so as to be white-colored, so that a shadow image of the paper sheet is not read even where the paper sheet is provided by a thin paper sheet having a high transmissivity. It is also noted that the biaser may be provided by a plurality of spring coils 31. In this case, the coil springs 31 are all positioned in an intermediate portion of the flat surface plate portion as viewed in the feed direction, and are equally spaced apart from each other as viewed in the longitudinal direction of the presser plate member 30, for assuring even distribution of the biasing force over the entirety of the flat surface plate portion of the presser plate member 80.

The present feeding device 2 has a presser-displacement preventer which is disposed between the downstream end 30c of the contact flat surface of the presser plate member 30 and the third pair of roller 28a, 28b as viewed in the feed direction, for preventing an upward displacement of the presser plate member 30 even when the presser plate member 30 is upwardly forced by a tension of the paper sheet in a stage in which the fed paper sheet bridges the downstream end 30c of the contact flat surface and the third pair of rollers 28a, 28b. In the present embodiment, the presser-displacement preventer is constituted by two rotatable members 33 (see FIG. 5) each of which is provided on the downstream side of the presser plate member 30 such that an axis 33b of each of the rotatable member 33 is distant from the plane S containing the original supporting surface. Each rotatable member 33 is positioned relative to a shortest route N (which is represented by broken line in FIG. 4) between the downstream end 30c of the contact flat surface and the original exit portion 12 (in which the third pair of rollers 28a, 28b are opposed to each other), such that the shortest route N interests a lower part of each rotatable member 33 as shown in FIG. 4.

The inclination of the paper sheet is changed as a result of contact of the paper sheet with an outer circumferential surface 33a of each rotatable member 33. That is) each rotatable member 33 serving as the presser-displacement preventer is positioned in such a position that permits each rotatable member 33 to force the paper sheet in a direction away from the shortest route N toward the plane S, so as to define a detour M (which is represented by one-dot chain line in FIG. 4) which passes a deviated position deviated from the shortest route N. In this sense, each rotatable member 33 may be also referred as to a detour definer. The outer circumferential surface 33a of each rotatable member 33 corresponds to a contact portion of the detour definer. The detour M consists of a first section extending between the downstream end 30c of the contact flat surface and the deviated position, and a second section extending between the deviated position and the original exit portion 12. A reference sign 81 represents a degree of the inclination of the paper sheet in an assumed case in which the paper sheet is fed along the shortest route N, namely, represents an angle defined by the shortest route N and the original supporting surface. A reference sign θ2 represents an angle defined by the first section of the detour M and the original supporting surface. A reference sign θ3 represents an angle defined by the second section of the detour M and the original supporting surface.

Figure 5:
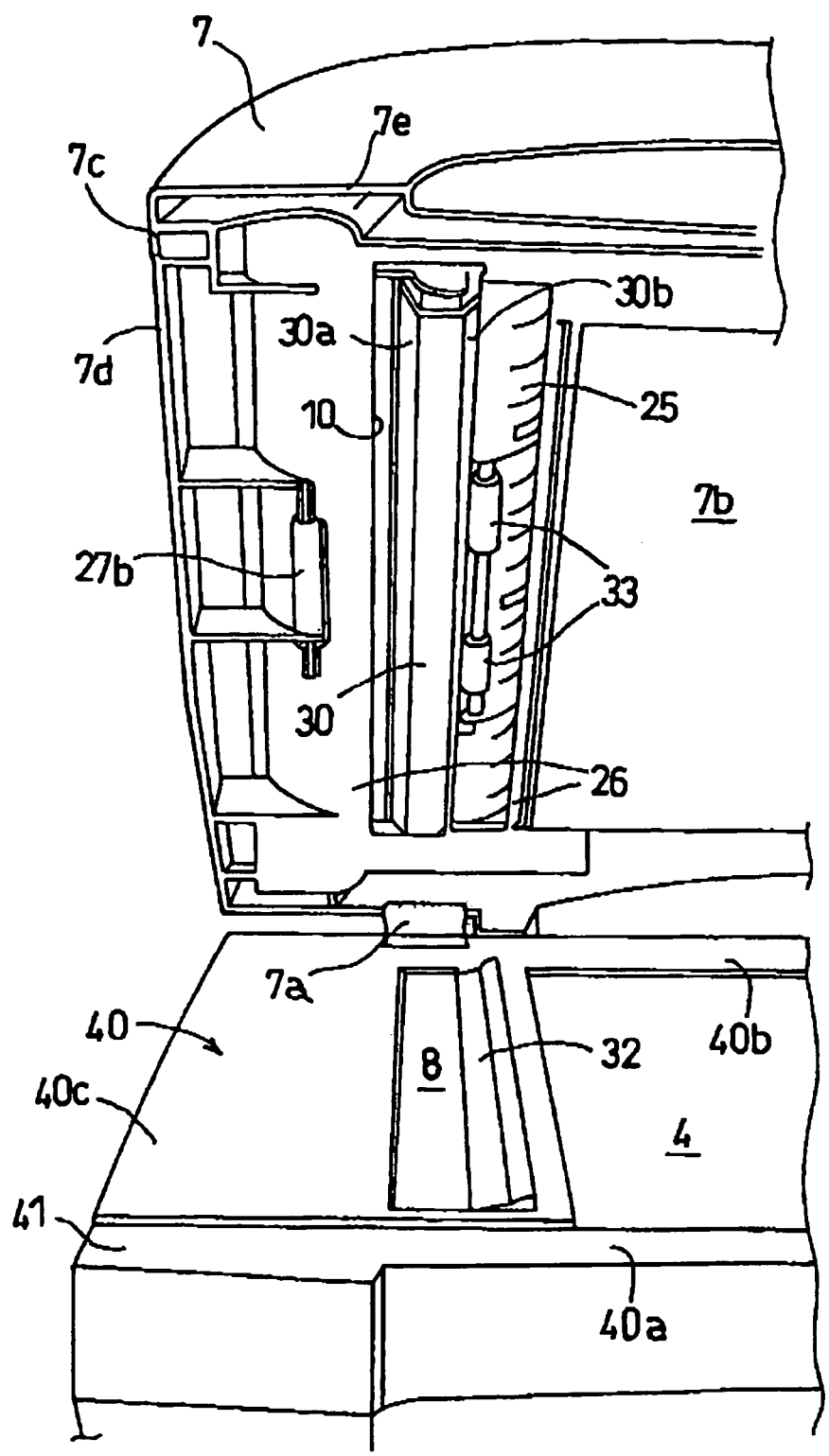
FIG. 5 is a view schematically illustrating a part of the multifunction apparatus of FIG. 1 when its cover body is open.

The two rotatable members 33 are provided by cylindrical rollers, and are coaxially arranged in the width direction of the paper sheet, as shown in FIG. 5. Each of the rotatable members 33 is rotated by the feed movement of the paper sheet which is brought into contact with an outer circumferential surface of the rotatable member 83.

A slant guide member 32 is provided to be contiguous to a downstream end 8a of the second transparent plate 8, as shown in FIG. 4. This slant guide member 32 has a guide surface provided by its slant upper surface having a height which is gradually increased as viewed in the feed direction. The guide surface is inclined with respect to the plane S by an angle that is larger than the angle θ2 and is smaller than the angle θ3. The paper sheet having passed below the presser plate member 30 is gradually raised by the slant guide member 32, as the paper sheet is fed in the feed direction. The slant guide member 32 has an upstream end 32a whose height is lower than that of the downstream end 8a of the second transparent plate 8, as shown in FIG. 4, for avoiding collision of the upstream end 32a of the slant guide member 32 against a leading end of the fed paper sheet. It is noted that an adhesive member 50 (e.g., an adhesive tape) is provided to bridge lower surfaces of the first and second transparent plates 4, 8 so as to cover a lower surface of the guide member 32 which is interposed between the first and second transparent plates 4, 8. The adhesive member 50 prevents paper powders or the like from dropping onto the image reader 9 via a gap between the upstream end 32a of the slant guide member 32 and the downstream end 8a of the second transparent plate 8, even in the event of deflection of the guide member 32. Thus, the adhesive member 50 serves to prevent the paper powders or the like from adhering to the imaged reader 9, thereby avoiding deterioration in accuracy in the image reading.

There will be described an image reading operation carried out by the apparatus 1 equipped with the feeding device 2 which is constructed as described above. The operation is initiated by setting paper sheets onto the original supply tray 14 such that a top surface (carrying an image to be read) of each paper sheet faces upwardly. In this instance, the presence of the paper sheets is detected by the original-presence detector (not shown). Then, in response to a command signal inputted through the control panel 5, the separate roller 22 is activated to separate an uppermost one of the paper sheets piled on the original supply tray 14, from the other paper sheets, so that the paper sheets are supplied one after another to the original supply portion 11. The supplied paper sheet is first pinched by the first pair of rollers 23a, 23b, whereby its feed movement along the feed path 20 is initiated. The paper sheet is fed by the first pair of rollers 23a, 23b, the U-turn-position roller 24 and the second pair of rollers 27a, 27b, toward the image reading position 10a. The paper sheet then enters between the presser plate member 30 and the upper surface (original supporting surface) of the second transparent plate 8, so as to be pressed onto the upper surface of the second transparent plate 8, by the presser plate member 30 biased by the coil spring 31, so that the image on the paper sheet thus positioned in the image reading position 10a is read by the image reader 9 which is located on the lower side of the second transparent plate 8.

After passing through the downstream end 30c of the contact flat surface of the presser plate member 30, the leading end portion of the paper sheet is first brought into contact with the guide surface of the slant guide member 32, and is then slid on the guide surface of the slant guide member 32. After passing through a downstream end of the guide surface of the slant guide member 32, the leading end portion of the paper sheet is temporarily left free, and is then brought into contact with a guide portion 26a of the lower plate 26, which portion extends in a direction away from the original exit portion 12 toward the slant guide member 32, as shown in FIG. 4. While the leading end portion of the paper sheet is being slid on the guide portion 26a, the paper sheet is brought in contact at its upper surface (which is opposite to the above-described top surface) with the outer circumferential surfaces of the rotatable members 33. With the contact of the paper sheet with the rotatable members 33, the paper sheet is bent at its contact portion (at which the paper sheet is in contact with the outer circumferential surface of each rotatable member 33), so as to be convexed in the downward direction. In this arrangement, the degree (corresponding to the angle $\theta 2$) of the inclination of the paper sheet in the first section between the presser plate member 30 and each rotatable member 33 is made smaller than the degree (corresponding to the angle $\theta 1$) of the inclination of the paper sheet in the assumed case in which the paper sheet is fed along the shortest route N, such that a ratio of the angle $\theta 2$ to the angle $\theta 1$ is lower than 0.8, preferably lower than 0.7 and more preferably 0.6. The degree (corresponding to the angle $\theta 3$) of the inclination of the paper sheet in the second section between each rotatable member 33 and the original exit portion 12 is made larger than the degree (corresponding to the angle $\theta 1$) of the inclination of the paper sheet in the assumed case in which the paper sheet is fed along the shortest route N. Therefore, the degree (angle $\theta 2$) of the inclination of the paper sheet in the first section is smaller than the degree (angle $\theta 3$) of the inclination of the paper sheet in the second section, thereby making it possible to reduce a component of the tension of the paper sheet, which component acts as a force forcing the presser plate member 30 to be displaced in the upward direction, so that the close contact of the paper sheet with the original supporting surface can be maintained. That is, although there is a limitation in the amount of the biasing force applied by the coil springs 31 to the presser plate member 30, as described above, undesirable displacement of the presser plate member 30 in a direction away from the original supporting surface is effectively prevented by the presser-displacement preventer. It is noted that the leading end portion of the paper sheet continues to be slid on the guide portion 26a of the lower plate 26 even after the paper sheet has been brought into contact with the rotatable members 33, and is eventually introduced between the third pair of rollers 28a, 28b.

While the paper sheet is being in contact with the rotatable members 33, the resistance against the feed movement of the paper sheet is not considerably increased since the rotatable members 33 are rotated by its contact with the paper sheet, namely, the feed movement of the paper sheet is not impeded by the rotatable members 33. The paper sheet released from the third pair of rollers 28a, 28b is received by the original exit tray 15.

As described above, each rotatable member 33 is positioned relative to the plane S such that its axis 33b is distant from the plane S. Further, each rotatable member 33 is positioned relative to the shortest route N such that the shortest route N intersects a lower part of each rotatable member 33 rather than an upper part of each rotatable member 33, so that the above-described angle $\theta 2$ is smaller than the above-described angle $\theta 3$ rather than being larger than the angle $\theta 3$, namely, so that the paper sheet bent upon its contact with the rotatable members 33 is convexed in the downward direction rather than in the upward direction.

While each of the rotatable members 33 may be disposed in any position located between the presser plate member 30 and the third pair of rollers 28a, 28b as viewed in the feed direction, it is preferable that each rotatable member 33 is positioned to be close to the downstream end 30c of the contact flat surface of the presser plate member 30 as viewed in the horizontal direction (i.e., a direction parallel with the plane S) as well as in the vertical direction (i.e., a direction perpendicular to the plane S).

Described more specifically, it is preferable that each rotatable member 33 is close to the downstream end 30c of the contact flat surface in the vertical direction, for example, such that a vertical distance between the plane S and a lower end portion of each rotatable member 33 is substantially equal to or slightly larger than a vertical distance between the plane S and the downstream end 30c of the contact flat surface. The dose positioning of each rotatable member 33 relative to the downstream end 30c of the contact flat surface in the vertical direction makes the above-described angle $\theta 2$ substantially zeroed, namely, substantially eliminates the inclination of the paper sheet in the first section of the detour M, thereby making it possible to eliminate or minimize the force forcing the presser plate member 30 to be displaced in the upward direction.

It is also preferable that each rotatable member 33 is close to the downstream end 30c of the contact flat surface in the horizontal direction, for example, such that a horizontal distance between the axis 33b of each rotatable member 33 and the downstream end 30c of the contact flat surface is not larger than one-third or more preferably one-fourth a distance between the axis 33b of each rotatable member 33 and mutually opposed portions of the third pair of rollers 28a, 28b. If each rotatable member 33 is not close to the downstream end 30c of the contact flat surface in the horizontal direction, the angle $\theta 2$ can not be substantially zeroed without the angle $\theta 3$ being made considerably large. If the angle $\theta 3$ is made considerably larger than the angle $\theta 2$, the posture of the paper sheet has to be abruptly changed in the above-described deviated position, i.e., a transition position between the first and second sections of the detour M, thereby increasing an area of a contact portion of the outer circumferential surface of each rotatable member 33 which is brought into contact with the paper sheet, namely, increasing a central angle of the contact portion of the outer circumferential surface of each rotatable member 33. Such an increase in the area or central angle of the contact portion of the outer circumferential surface might lead to an increase in the resistance against the feed movement of the paper sheet, because each rotatable member 33 is not necessarily constantly rotated except in a stage in which the paper sheet is gripped by both of the second and third pairs of rollers 27, 28. Further, if the angle $\theta 3$ is excessively large, the paper sheet has an extremely upward posture upon its exit through the third pair of rollers 28a, 28b, possibly having a difficulty in stably landing on the surface of the original exit tray 15 which is substantially horizontal. Further, if each rotatable member 33 is not close to the downstream end 30c of the contact flat surface in the horizontal direction, a distance or gap between the guide surface of the slant guide member 32 and the outer circumferential surface of each rotatable member 33 is considerably made small thereby making it difficult for the paper sheet to smoothly pas through the gap. The present feeding device 2 is free from these problems, owing to the close positioning of each rotatable member 33 relative to the downstream end 30c of the contact flat surface. In the present embodiment in which the angle $\theta 1$ is about 32°, each rotatable member 33 is positioned in such a position that makes the angles $\theta 2$, $\theta 3$ being about 18° and about 35°, respectively.

While each of the rotatable members 33 is provided by a rotatable member freely rotatable in the present embodiment, it may be provided by a rotatable member rotatable by a drive source such as an electric motor In the present embodiment, the downstream-side feeder for giving the paper sheet the inclined posture is provided by the third pair of rollers 28a, 28b which are positioned in the original exit portion 12. However, the downstream-side feeder may be provided by another pair of rollers which are positioned on the upstream side of the third pair of rollers 28a, 28b.

Figure 6A:
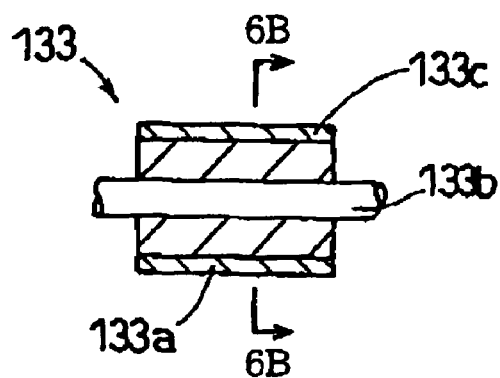
FIG. 6A is an elevational view partial in cross section of one modified form of a rotatable member of the feeding device.
Figure 6B:
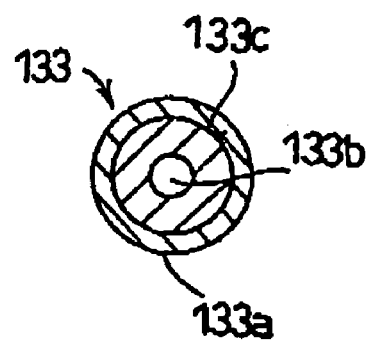
FIG. 6B is a cross sectional view taken along line 6B-6B of FIG. 6A.
Figure 7A:
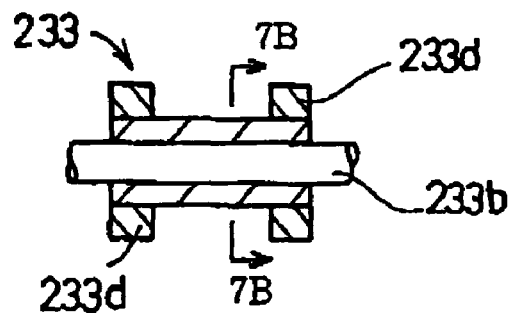
FIG. 7A is an elevational view partially in cross section of another modified form of the rotatable member of the feeding device.
Figure 7B:
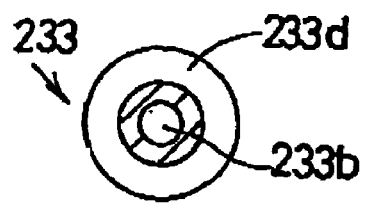
FIG. 7B is a cross sectional view taken along line 7B-7B of FIG. 7A.
Figures 8A, 8B:
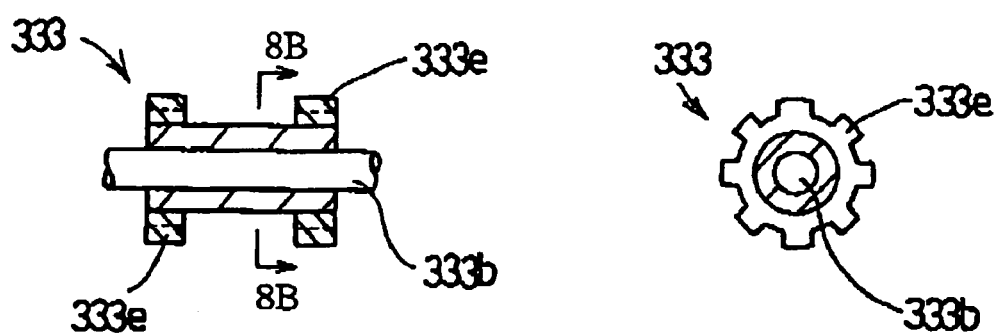
FIG. 8A is an elevational view partially in cross section of still another modified form of the rotatable member of the feeding device.
FIG. 8B is a cross sectional view taken along line 8B-8B of FIG. 8A.

Further, each of the rotatable member 33 having a simple cylindrical shape may be replaced with another rotatable member having a different shape. FIGS. 6A and 6B show a rotatable member 133 having an axis 138b and a radially outer portion 133c which is made of an elastic material and which provides an outer circumferential surface 133a that is to be brought into contact with a paper sheet as the original. FIGS. 7A and 7B show a rotatable member 233 having an axis 233b, an axially intermediate portion and axially opposite end portions which have a larger diameter than the axially intermediate portion, wherein at least a radially outer portion 233d of each of the axially opposite end portions is made of an elastic material FIGS. 8A and 8B show a rotatable member 333 having an axis 333b, an axially intermediate portion and axially opposite end portions which have a larger diameter than the axially intermediate portion, wherein at least a radially outer portion 333e of each of the axially opposite end portions is made of an elastic material The radially outer portion 333e of each of the axially opposite end portions of the rotatable member 333 has an outer circumferential surface which is provided by a succession of protrusions and recesses which are alternately arranged as viewed in a circumferential direction of the rotatable member 333. The elastic material for forming the above-described radially outer portion 133c, 233d or 333e may be sponge, rubber, or other elastic material.

Where the contact portion of the rotatable member (which is to be brought into contact with the paper sheet) is provided by the elastic material as in the above-described rotatable members 133, 233, 333, the elastic contact portion of the rotatable member is, upon its contact with the paper sheet, elastically deformed in the radially inward direction, thereby leading to an increase in area of the contact surface and making it possible to more assuredly rotate the rotatable member. It is therefore possible to prevent sliding of the paper sheet on the outer circumferential surface of the rotatable member, which could be caused if the rotatable member is not rotated in spite of its contact with the paper sheet. Thus, the paper sheet can be prevented from being rubbed with the outer circumferential surface of the rotatable member. Further, the rotatable members 283, 333 having the large-diameter portions provide another technical advantage that the above-described angle θ2 (i.e., the inclination of the paper sheet in the first section of the detour M) can be made small even where the axis of the rotatable members can not be positioned to be close to the plane S. In this case, it is also possible to form cutouts in portions of the downstream end portion 30b of the presser plate member 30, which portions correspond to the large-diameter portions of the rotatable members, for thereby avoiding interference of the rotatable members with the presser plate member 30. Such an arrangement provides a higher degree of freedom in designing a positional relationship between the rotatable members and the presser plate member 30 and determining an outside diameter of the rotatable members.

Figure 9:
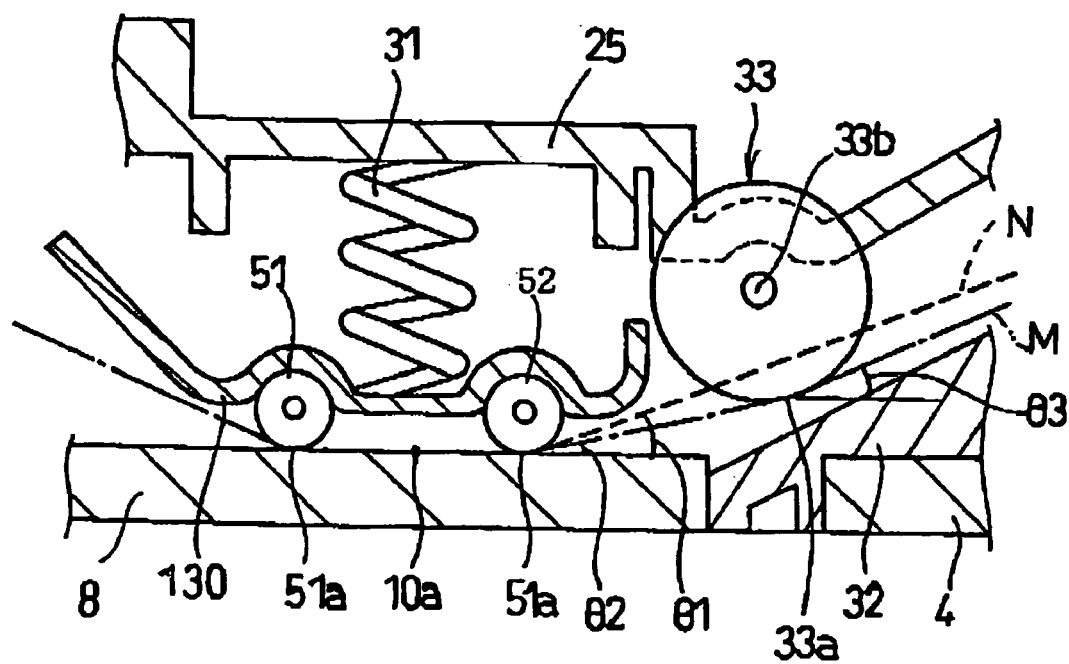
FIG. 9 is a front view partially in cross section of one modified form of a presser of the feeding device.

While the presser is provided by the presser plate member 30 in the above-described embodiment, the presser may be constructed to include a holder portion 130 and a plurality of contact rollers 51, 52 held by the holder portion 130, as shown in FIG. 9. Each of the contact rollers 51, 62 is rotatable about its axis which is parallel with the upper surface of the second transparent plate 8 and is perpendicular to the feed direction. The reference sign 51 denotes a plurality of upstream-side contact rollers which are coaxially arranged along a straight line, so as to constitute an upstream-side roller assembly. The reference sing 52 denotes a plurality of downstream-side contact rollers which are coaxially arranged along another straight line (which is spaced apart from the above-described straight line as viewed in the feed direction), so as to constitute a downstream-side roller assembly. In this arrangement in which the paper sheet passing below the holder portion 130 is pressed by outer circumferential surfaces 51a, 52a of the rotatable contact rollers 51, 52, the resistance acting against the feed movement of the paper sheet can be smaller than in the above-described embodiment in which the paper sheet is slidingly moved along the presser plate member 30. In this sense, the biasing force generated by the coil spring 31 can be adapted to be larger than in the above-described embodiment. It is noted that the above-described straight lines (along which the upstream-side and downstream-side contact rollers 51, 52 are arranged) are spaced apart from each other by a distance that is substantially equal to the length of the flat surface plate portion of the presser plate member 30 (as measured in the feed direction) in the above-described embodiment. It is also noted that each of the above-described upstream-side and downstream-side roller assemblies has an entire axial length that is substantially equal to the length of the presser plate member 30 (as measured in the width direction of the paper sheet) in the above-described embodiment. It is further noted that the contact rollers of each of the upstream-side and downstream-side roller assemblies may be arranged without an axial spacing therebetween, or may be axially spaced apart from each other. In the latter case, a ratio of a sum of axial lengths of the contact rollers to the entire axial length is not smaller than 0.7, preferably not smaller than 0.8.

Referring next to FIG. 2, there will be described a shading structure which is provided to serve for an image reading operation on the first transparent plate 4 in the multifunction apparatus 1. The shading structure includes a frame 40 which is provided by a flat plate member constituting an upper end portion of the main body 3 of the apparatus 1. The frame 40, which is formed to surround the first transparent plate 4, includes a front-side frame portion 40a, a rear-side frame portion 40b, a left-side frame portion 40c and a right-side frame portion 40d. The rear-side, left-side and right-side frame portions 40b, 40c, 40d are provided by a large-height portion of the flat plate member, such that upper surfaces of the rear-side, left-side and right-side frame portions 40b, 40c, 40d are positioned in a higher position than the upper surface of the first transparent plate 4. The front-side frame portion 40a is provided by a small-height portion of the flat plate member, such that an upper surface of the front-side fame portion 40a is flush with the upper surface of the first transparent plate 4. The front-side frame portion 40a, whose upper surface is lower than those of the other frame portions 40b, 40c, 40d, extends between lengthwise opposite ends of the main body 3, and forms steps 41 at its intersections with the left-side and right-side frame portions 40c, 40d.

The lower surface of the cover body 7 is shaped to conform to the shape of the frame 40, so as to be fitted with the upper surface of the main body 3 when the cover body 7 is placed in its close position. Described specifically, the lower surface of the cover body 7 has lengthwise opposite end portions 7d and a front end portion 7e which extends between lengthwise opposite ends 7c of the cover body 3. The front end portion 7e projects downwardly further than the lengthwise opposite end portions 7d, and forms steps at its intersections with the lengthwise opposite end portions 7d, such that the steps correspond to the steps 41 of the frame 40 in their positions and heights.

Owing to the above-described shading structure, even where an original has a height so large that the cover body 3 can not be placed at its fully closed position, namely, even where there is left a gap between the front-side frame portion 40a of the frame 40 and the front end portion 7e of the lower surface of the cover body 7, it is possible to prevent deterioration in the image reading accuracy, since the downwardly projecting front end portion 7e of the lower surface of the cover body 7 serves to shade the transparent plate 4 from a light.

While the preferred embodiment of the invention has been described in detail by reference to the accompanying drawings, it is to be understood that the invention is not limited to the details of the illustrated embodiment, but may be embodied with various other changes, modifications and improvements, which may occur to those skilled in the art.

What is claimed is:

1. A feeding device to be incorporated in an image reading apparatus including an image reader operable to read an image carried by an original which is being fed by the feeding device in a feed direction, the feeding device comprising:
   a feed-path definer defining a feed path along which the original is fed from an original supply portion to an original exit portion via a reading position, such that the original supplied through the original supply portion is, upon arrival thereof in the reading position, brought into contact with an original supporting surface of the image reader whereby the image is read by the image reader, and such that the original exits the feeding device through the original exit portion after the image has been read by the image reader;
   a presser opposed to the original supporting surface and biased toward the original supporting surface, the presser having a contact surface which is held in contact with the original during presence of the original between the presser and the original supporting surface and which is held in contact with the original supporting surface during absence of the original between the presser and the original supporting surface;
   a downstream-side feeder disposed on a downstream side of the presser as viewed in the feed direction, and operable to feed the original in the feed direction, the downstream-side feeder being distant from a plane containing the original supporting surface, so that the original takes a posture inclined with respect to the plane when the original bridges between the presser and the downstream-side feeder; and
   a presser-displacement preventer which is disposed between the presser and the downstream-side feeder as viewed in the feed direction, for preventing displacement of the presser in a direction away from the original supporting surface,
   wherein the presser-displacement preventer includes a rotatable member which is disposed between the presser and the downstream-side feeder as viewed in the feed direction, and which is driven by the original that is brought into contact with an outer circumferential surface of the rotatable member.

2. The feeding device according to claim 1, wherein the original exit portion is distant from the plane, such that a shortest route connecting a downstream end of the contact surface and the original exit portion is inclined with respect to the plane by an angle that is not smaller than 18°.

3. The feeding device according to claim 2, wherein the downstream-side feeder includes a pair of rollers which are mutually opposed in the original exit portion so as to pinch the original therebetween in the original exit portion.

4. The feeding device according to claim 2,
   wherein the presser-displacement preventer includes a detour definer having a contact portion which is to be brought into contact with the original and which is positioned in one of opposite sides of the shortest route that is closer to the plane, for defining a detour which connects the downstream end of the contact surface and the original exit portion and which includes a first section between the downstream end of the contact surface and the contact portion of the detour definer and a second section between the contact portion of the detour definer and the downstream-side feeder, and
   wherein an inclination of the first section of the detour with respect to the plane is smaller than an inclination of the second section of the detour with respect to the plane.

5. The feeding device according to claim 4,
   wherein the detour definer of the presser-displacement preventer includes the rotatable member rotatable about an axis thereof that is distant from the plane, and
   wherein the rotatable member is positioned in such a position that permits the outer circumferential surface of the rotatable member as the contact portion to intersect the shortest route.

6. The feeding device according to claim 5,
   wherein the downstream-side feeder includes a pair of rollers which are opposed at opposed portions thereof to each other, so as to pinch the original therebetween, and
   wherein the rotatable member is positioned in vicinity of a downstream end of the contact surface of the presser, such that a distance between the downstream end of the contact surface and the axis of the rotatable member as measured in a direction parallel with the plane is not larger than one-third a distance between the axis of the rotatable member and the opposed portions of the pair of rollers as measured in a direction parallel with the plane.

7. The feeding device according to claim 5, wherein the rotatable member includes a radially outer portion which is provided by an elastic portion.

8. The feeding device according to claim 5, wherein the rotatable member includes a small diameter portion and a large diameter portion which has a larger diameter than that of the small diameter portion.

9. The feeding device according to claim 8, wherein the large diameter portion is provided by an elastic portion.

10. The feeding device according to claim 1, wherein the presser includes a flat surface plate portion which provides the contact surface.

11. The feeding device according to claim 10,
    wherein the flat surface plate portion of the presser is elongated in a direction which is parallel with the original supporting surface and which is perpendicular to the feed direction, and
    wherein the flat surface plate portion has a length not smaller than a width of the feed path defined by the feed-path definer.

12. The feeding device according to claim 1,
    wherein the presser includes a holder portion, and a contact roller which is held by the holder portion such that the contact roller is rotatable about an axis thereof which is parallel with the original supporting surface and which is perpendicular to the feed direction, and
    wherein the contact roller has an outer circumferential surface which provides the contact surface.

13. The feeding device according to claim 12,
    wherein the presser includes a plurality of contact rollers, the plurality of contact rollers being disposed coaxially with each other, so as to cooperate with each other to constitute a roller assembly,
    wherein the roller assembly has an entire axial length that is not smaller than a width of the feed path defined by the feed-path definer, and wherein a ratio of a sum of axial lengths of the plurality of contact rollers with respect to the entire axial length is not smaller than 0.7.

14. The feeding device according to claim 1, wherein the feed path defined by the feed-path definer has a substantially U shape, such that the original supplied through the original supply portion is, upon arrival thereof in a U-turn position which is located on an upstream side of the reading position, guided to make a U-turn so as to be fed toward the reading position.

15. The feeding device according to claim 1,
wherein the presser is disposed in a position which is displaceable relative to the feed-path definer, and
wherein the presser-displacement preventer is disposed in a position which is not displaceable relative to the feed-path definer.

16. A feeding device to be incorporated in an image reading apparatus including an image reader operable to read an image carried by an original which is being fed by the feeding device in a feed direction, the feeding device comprising:
a feed-path definer defining a feed path along which the original is fed from an original supply portion to an original exit portion via a reading position, such that the original supplied through the original supply portion is, upon arrival thereof in the reading position, brought into contact with an original supporting surface of the image reader whereby the image is read by the image reader, and such that the original exits the feeding device through the original exit portion after the image has been read by the image reader;
a presser opposed to the original supporting surface and biased toward the original supporting surface, the presser having a contact surface which is held in contact with the original during presence of the original between the presser and the original supporting surface and which is held in contact with the original supporting surface during absence of the original between the presser and the original supporting surface;
a downstream-side feeder disposed on a downstream side of the presser as viewed in the feed direction, and operable to feed the original in the feed direction, the downstream-side feeder being distant from a plane containing the original supporting surface, so that the original takes a posture inclined with respect to the plane when the original bridges between the presser and the downstream-side feeder; and
a presser-displacement preventer which is disposed between the presser and the downstream-side feeder as viewed in the feed direction, for preventing displacement of the presser in a direction away from the original supporting surface,
wherein the presser-displacement preventer includes a rotatable member which is disposed between the presser and the downstream-side feeder as viewed in the feed direction, such that an outer circumferential surface of the rotatable member is in contact with the original in a rotatable-member contact position, and such that a distance between the plane and the rotatable-member contact position is larger than a distance between the plane and a presser contact position in which the contact surface of the presser is in contact with the original.

* * * * *